US008257563B2

(12) United States Patent
Hartvigsen

(10) Patent No.: US 8,257,563 B2
(45) Date of Patent: Sep. 4, 2012

(54) HIGH PURITY HYDROGEN AND ELECTRIC POWER CO-GENERATION APPARATUS AND METHOD

(75) Inventor: Joseph J. Hartvigsen, Kaysville, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 1360 days.

(21) Appl. No.: 11/854,963

(22) Filed: Sep. 13, 2007

(65) Prior Publication Data

US 2008/0060935 A1    Mar. 13, 2008

Related U.S. Application Data

(60) Provisional application No. 60/825,571, filed on Sep. 13, 2006.

(51) Int. Cl.
C25B 1/02 (2006.01)
(52) U.S. Cl. .................. 204/257; 205/637; 429/452
(58) Field of Classification Search .............. 204/257; 205/637; 429/452
See application file for complete search history.

(56) References Cited

U.S. PATENT DOCUMENTS

| | | | |
|---|---|---|---|
| 6,007,742 A | 12/1999 | Czernichowski et al. | |
| 2004/0180249 A1 | 9/2004 | Pham et al. | |
| 2004/0202914 A1* | 10/2004 | Sridhar et al. | 429/34 |
| 2007/0116996 A1* | 5/2007 | Pavlik et al. | 429/21 |

OTHER PUBLICATIONS

Jensen et al. ("Perspectives of High Temperature Electrolysis Using SOEC". Paper presented at 19th World Energy Congress 2004, Sydney (AU), Sep 5-9, 2004. World Energy Council, 5th Floor, Regency House, 1-4 Warwick Street, London W1B 5LT, UK (2004).*
Pham, "High Efficiency Steam Electrolyzer", *Proceedings of the 2000 U.S. DOE Hydrogen Program Review*, Presented at the 2000 U.S. DOE Hydrogren Program Review: San Ramon, California; May 9-11, 2000, NREL/CP-570-28890, (2000), 1-10.
Pham, et al., "High-Efficiency Steam Electrolyzer", *Proceedings of the 2002 U.S. DOE Hydrogen Program Review*, Presented at the 2002 Annual Hydrogren Program Review: Golden, Colorado; May 6-8, 2002, NREL/CP-610-32405, (2002),1-7.
Huang, Keqin et al., "Characterization of Sr-doped LaMnO3 and LaCaO3 as Cathode Materials for a Doped LaGaO3 Ceramic Fuel Cell", *J. Electrochm. Soc.*, vol. 143, No. 11,(Nov. 1996),3630-3636.
Copenheaver, Blaine "Written Opinion of the International Searching Authority", (Mar. 28, 2008),1-4.
Copenheaver, Blaine "International Search Report", (Mar. 28, 2008),1-2.
O'Brien, et al., "Performance measurements of solid-oxide electrolysis cells for hydrogen production from nuclear energy", *Proc. ICONE12, 12th International Conference on Nuclear Engineering*, Arlington, VA, Apr. 2004, (Apr. 2004),1-10.
Maskalick, "High Temperature Electrolysis Cell Performance Characterization", *Int. J. Hydrogen Energy*, vol. 11, (1986),563.

(Continued)

Primary Examiner — Nicholas A. Smith
(74) Attorney, Agent, or Firm — David Fonda

(57) ABSTRACT

An apparatus to produce high purity hydrogen and electricity is disclosed in one embodiment of the invention as including a fuel cell configured to convert the chemical energy of a fuel to electricity and heat. An electrolyzer cell is placed in electrical and thermal communication with the fuel cell and is configured to electrolyze an oxygen-containing compound, such as steam or carbon dioxide, using the electricity and heat generated by the fuel cell. In selected embodiments, the fuel cell and electrolyzer cell are physically integrated into a single electrochemical cell stack.

27 Claims, 7 Drawing Sheets

OTHER PUBLICATIONS

Doenitz, et al., "Hydrogen Production by High Temperature Electrolysis of Water Vapour", *Int. J Hydrogen Energy*, vol. 5, (1980),55-63.

Erdle, et al., "Reversible and Polarization Behavior of High Temperature Solid Oxide Electrochemical Cells", *Hydrogen Energy Conference Proceedings*, Hawaii, (1990),415-411

Marina, et al., "Characterization of electrodes for reversible solid oxide fuel cells", *Meeting Abstracts,* v MA 2005-02, *208th Meeting of The Electrochemical Society—Meeting Abstracts*, (2005),1988.

Hartvigsen, J et al., "Operation and Analysis of SOFCs in Steam Electrolysis Mode", *Sixth European SOFC Forum*, Lucerne, Switzerland, (Jun. 2004),378-387.

Jiang, et al., "A High Performance, Anode-Supported Solid Oxide Fuel Cell Operating on Direct Alcohol", *Journal of The Electrochemical Society*, vol. 148, Issue 7, (Jul. 2001),A706-A709.

Simner, S P., et al., "Degradation Mechanisms of La—Sr—Co—Fe—O3 SOFC Cathodes", *Electrochemical and Solid-State Letters*, vol. 9, Issue 10, (2006),A478-A481.

Milliken, C et al., "Characterization and Performance of Ceria Based SOFCs", *Solid Oxide Fuel Cells IV*, ed. Dokiya, Yamomoto, Tagawa, and Singhal, Electrochemical Society, (1995),1049-1055.

Goedickemeier, M et al., "Current-Voltage Characteristics of Fuel Cells with Ceria-Based Electrolytes", *Solid Oxide Fuel Cells IV*, Ed. M. Dokiya, O. Yamamoto, H. Tagawa and S.C. Singhal, (1995),1072-1081.

Ishihara, Tatsumi et al., "Potentiometric Oxygen Sensor Operable in Low Temperature by Applying LaGaO3-Based Oxide for Electrolyte", *J. Electrochem. Soc.*, vol. 144, No. 5, (May 1997),L122-L125.

Ishikara, Tatsumi et al., "Application of the New Oxide Ionic Conductor, LaGaO3, To the Solid Electrolyte of Fuel Cells", *Proc. of the IV Intl. Symp. on SOFCs*, eds. Yamamoto, Tagawa and Singhal, (1995),344-352.

Huang, Keqin et al., "Electrode Performance Test on Single Ceramic Fuel Cells Using as Electrolyte Sr- and Mg-Doped LaGaO3", *J. Electrochem. Soc.*, vol. 144, No. 10, (1997),3620-3623.

Bakker, W.T., et al., "Doped Lanthanum Gallate, A Superior Electrolyte for Low Temperature Solid Oxide Fuel Cells", *Fuel Cell Seminar Abstracts*, Palm Springs, CA, (1998),250-253.

Yamada, T et al., "Development of Intermediate-Temperature SOFC Module Using Doped Lanthanum Gallate", *Electrochemical Society Proceedings* vol. 2003-07, (2003),113-118.

Huang, Keqin et al., "Superior Perovskite Oxide-Ion Conductor; Strontium- and Magnesium-Doped LaGaO3: I, Phase Relationships and Electrical Properties", *J. Am. Ceram. Soc.* vol. 81, No. 10, (Oct. 1998),2565-2585.

Elangovan, Singaravelu et al., "Intermediate Temperature Stack Operation Using Lanthanum Gallate Electrolyte System", *Proc. Sixth European SOFC Forum*, Lucerne, Switzerland, (Jul. 2004),97-104.

* cited by examiner

HIGH PURITY HYDROGEN AND ELECTRIC POWER CO-GENERATION APPARATUS AND METHOD

RELATED APPLICATIONS

This application claims priority to U.S. Provisional Patent No. 60/825,571 filed on Sep. 13, 2006 and entitled CO-GENERATION OF HIGH PURITY HYDROGEN AND ELECTRIC POWER.

BACKGROUND OF THE INVENTION

1. Field of the Invention

This invention relates to fuel cells and high temperature steam electrolysis, and more particularly to apparatus and methods for integrating fuel cell and high temperature steam electrolysis technology.

2. Description of the Related Art

There is a great deal of interest in hydrogen technologies such as fuel cells to reduce emissions and dependence on fossil fuels. Many expect fuel cells to be an important component in establishing a "hydrogen economy." Unfortunately, the present infrastructure for production, storage, and delivery of hydrogen is currently vastly inadequate to support a hydrogen economy. Furthermore, problems associated with hydrogen production and storage are complicated by the fact that some fuel cell technologies require ultra-high purity hydrogen to operate effectively.

For example, commercial applications of low-temperature proton-exchange-member (PEM) fuel cells, one of the most promising current technologies for use in automobiles, require very high purity hydrogen to operate. Even sub-parts per million of carbon monoxide in the hydrogen, for example, will act as a poison in many PEM fuel cells. Although hydrogen for use in PEM fuel cells may be derived from hydrocarbon fuels, this method of production typically requires complex chemical processing equipment to remove carbon monoxide and/or carbon dioxide to produce hydrogen with sufficient purity for PEM applications. Alternatively, electrolysis may be used to produce high purity oxygen. This method, however, requires both heat and electric power inputs. High temperature steam electrolysis has a reduced electric power requirement, but requires greater thermal input compared to aqueous electrolysis.

Furthermore, society is always searching for more efficient means for producing electricity. Currently, solid oxide fuel cells (SOFCs) provide one promising technology for producing electricity. Unlike the PEM fuel cells discussed above, solid oxide fuel cells are more fuel flexible and are able to utilize both hydrogen and carbon monoxide as fuel to produce electricity. Nevertheless, solid oxide fuel cells, typically operate at much higher temperatures (e.g., at or around 800 to 850° C.) than PEM fuel cells. The higher operating temperature of SOFCs reduces or eliminates the need for expensive catalysts (e.g., platinum) used in PEM fuels cells.

Although the performance of SOFCs continues to improve at temperatures above 800 to 850° C., SOFCs begin to degrade rapidly as operating temperatures increase beyond these levels. As a result, the operating temperature of SOFCs must be carefully controlled to maximize its life and performance. For this reason, airflow rates through SOFCs are generally designed to be significantly higher than what is needed for the electrochemical reaction in order to remove waste heat from the SOFCs. This generally requires expensive heat exchangers to pre-heat the large airflow through the SOFCs. These heat exchangers are typically a large part of the total system cost of conventional SOFCs.

In view of the foregoing, what is needed is an apparatus and method for integrating fuel cell technology with high temperature steam electrolysis technology in a way that increases the efficiency of both systems. Such an integrated system could be used to produce high purity hydrogen and electricity more efficiently than producing them separately. Such a system could also be used to extract significantly more useable energy from hydrocarbon fuels. Further needed is an apparatus and method to reduce the airflow requirements for conventional SOFCs while simultaneously reducing the amount of electricity required to perform high temperature steam electrolysis.

SUMMARY OF THE INVENTION

Consistent with the foregoing and in accordance with the invention as embodied and broadly described herein, an apparatus to produce high purity hydrogen and electricity is disclosed in one embodiment of the invention as including a fuel cell configured to convert the chemical energy of a fuel to electricity and heat. An electrolyzer cell is placed in electrical and thermal communication with the fuel cell and is configured to electrolyze an oxygen-containing compound, such as steam or carbon dioxide, using the electricity and heat generated by the fuel cell. In selected embodiments, the fuel cell and electrolyzer cell are physically integrated into a single electrochemical cell stack.

In selected embodiments, the fuel is a reformed fuel (e.g., synthesis gas) and the electrolyzer cell is further configured to partially oxidize a hydrocarbon fuel to produce the reformed fuel. The electrolyzer cell may further use heat generated by the fuel cell to aid in partially oxidizing the hydrocarbon fuel. In certain embodiments, the fuel cell is a solid oxide fuel cell and the electrolyzer cell is a solid oxide electrolyzer cell, although the invention may also be applicable to other high-temperature fuel cells such as molten carbonate fuel cells, or the like.

In another aspect of the invention, a method to produce high purity hydrogen and electricity includes providing a fuel cell and an electrolyzer cell, each including an anode, a cathode, and an electrolyte between the anode and cathode. The method further includes converting, with the fuel cell, the chemical energy of a fuel to electricity and heat and transferring at least a portion of the heat and electricity to the electrolyzer cell. The method then includes electrolyzing, with the electrolyzer cell, an oxygen-containing compound using the heat and electricity generated by the fuel cell. In certain embodiments, the fuel is a reformed fuel and the method includes partially oxidizing, with the electrolyzer cell, a hydrocarbon fuel to produce the reformed fuel.

In another aspect of the invention, a method to produce high purity hydrogen and electricity includes providing a fuel cell and an electrolyzer cell, each including an anode, a cathode, and an electrolyte between the anode and cathode. The method then includes partially oxidizing, at an anode of the electrolyzer cell, hydrocarbon fuel to produce synthesis gas. This synthesis gas may then be conveyed to an anode of the fuel cell. At the anode of the fuel cell, the synthesis gas may be converted to steam and carbon dioxide. Similarly, at the cathode of the electrolyzer cell, steam may be electrolyzed to produce high purity hydrogen. At the cathode of the fuel cell, oxygen gas may be reduced to produce oxygen ions.

In another aspect of the invention, an integrated electrochemical stack to produce high purity hydrogen and electricity may include multiple fuel cells configured to convert the chemical energy of a fuel to electricity and heat. The stack may further include multiple electrolyzer cells interleaved with the fuel cells to produce a single electrochemical cell stack. The electrolyzer cells may be placed in electrical and thermal communication with the fuel cells and may be configured to electrolyze an oxygen-containing compound using electricity and heat generated by the fuel cells. In selected embodiments, the fuel is a reformed fuel and the electrolyzer cells are further configured to partially oxidize hydrocarbon fuel to produce the reformed fuel. The electrolyzer cells may utilize the heat generated by the fuel cells to aid in partially oxidizing the hydrocarbon fuel.

The present invention provides an apparatus and method for generating electricity and hydrogen in a way that improves the efficiency of both processes. The features and advantages of the present invention will become more fully apparent from the following description and appended claims, or may be learned by practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
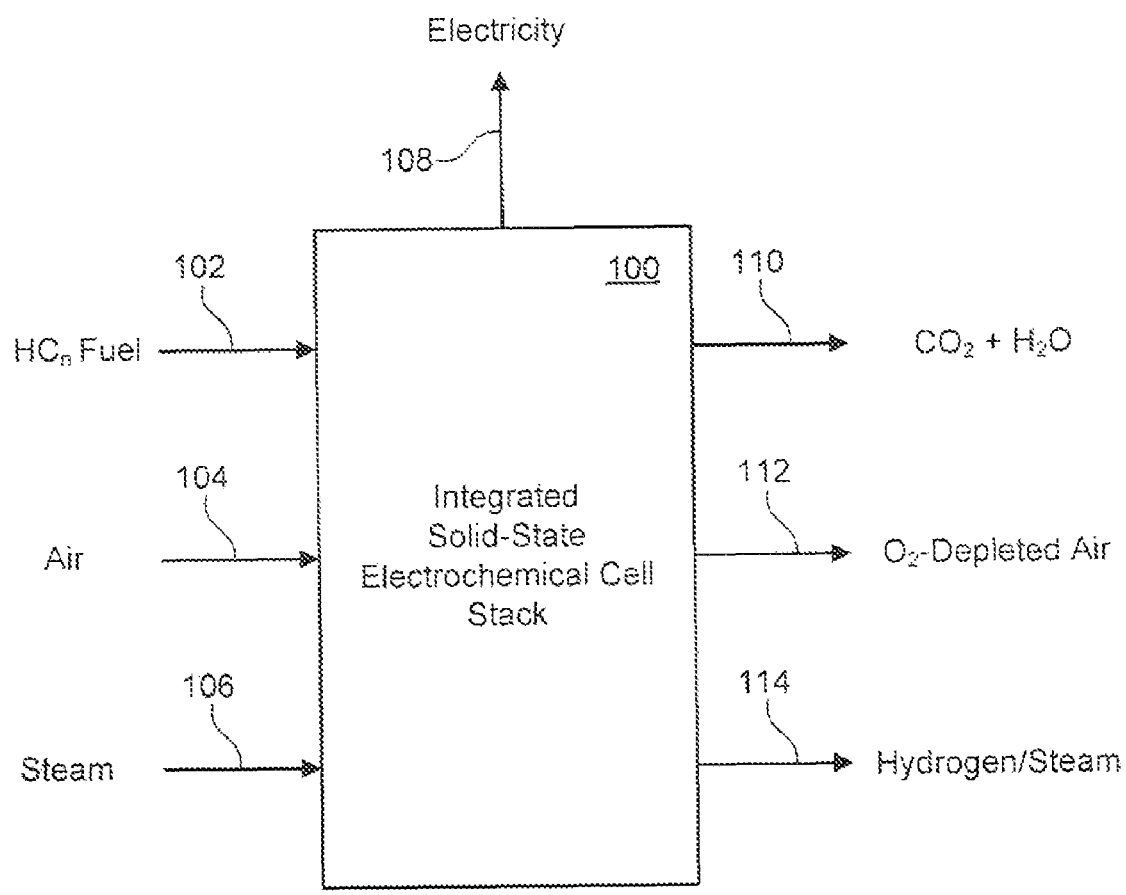
FIG. 1 is a high-level block diagram showing the inputs and outputs of an electrochemical cell stack in accordance with the invention.

Referring to FIG. 1, in general, an integrated solid-state electrochemical cell stack 100 in accordance with the invention may be configured to receive as inputs a hydrocarbon fuel 102 such as natural gas, methane, propane, butane, or the like; an oxygen-containing gas stream 104 such as air, and an oxygen-containing compound 106 such as steam. Alternatively, the oxygen-containing compound 106 may be a compound such as carbon dioxide (if the stack 100 is used as a carbon dioxide sink as opposed to a hydrogen generator). At its outputs, the solid-state electrochemical cell stack 100 may produce electricity 108, a stream 110 of carbon dioxide and steam, a stream 112 of oxygen-depleted air, and a stream 114 of hydrogen along with any residual steam. In this embodiment, the electricity and hydrogen outputs 108, 114 are the primary product streams produced by the electrochemical stack 100.

As will be explained in more detail hereafter, the integrated solid-state electrochemical stack 100 may include electrochemical cells that perform significantly different functions but which are nevertheless physically integrated into a single electrochemical stack 100. This enables the electrochemical cells to be both electrically and thermally integrated in a way that increases the efficiency of each of the electrochemical cells. More specifically, this configuration increases the amount of electricity and hydrogen that can be extracted from a hydrocarbon fuel 102. This, in turn, reduces the cost of the electricity and hydrogen, and enables more useable energy to be extracted from a hydrocarbon feedstock fuel.

Figure 2:
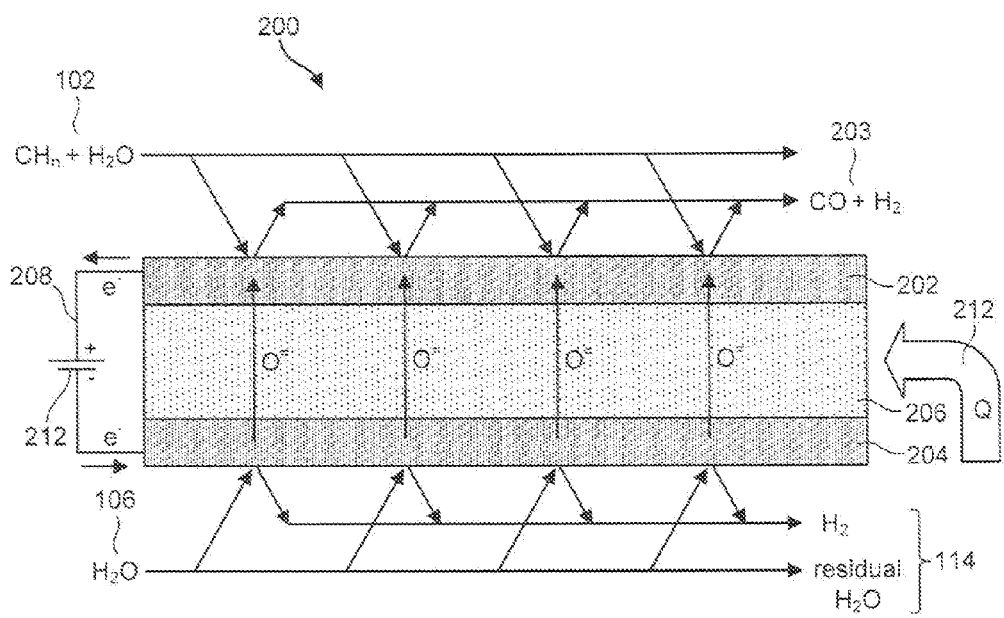
FIG. 2 is a high-level block diagram showing one embodiment of an electrolyzer/partial oxidation cell for use with an electrochemical cell stack in accordance with the invention.
Figure 3:
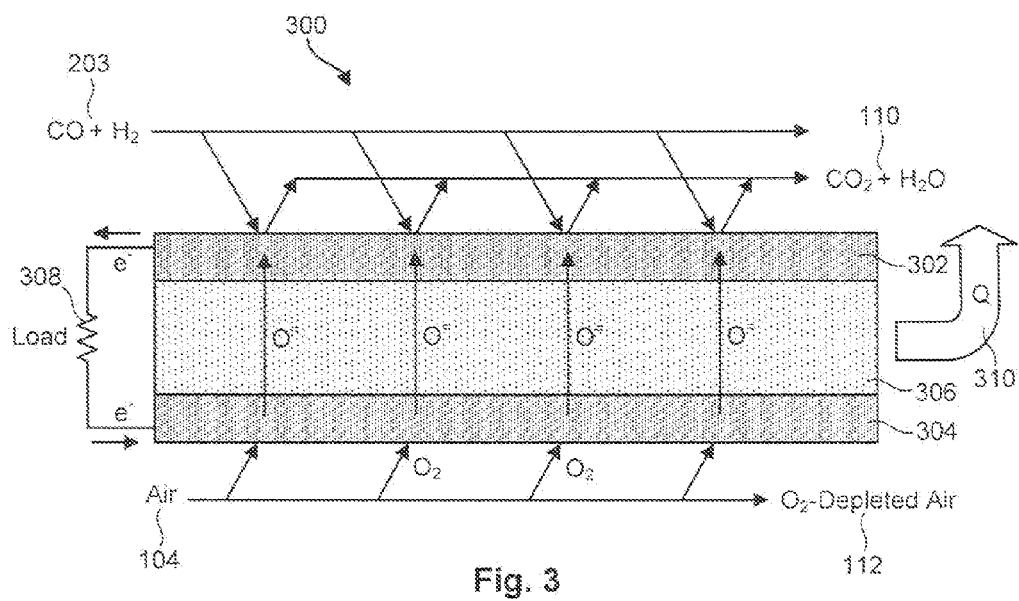
FIG. 3 is a high-level block diagram showing one embodiment of a fuel cell for use with an electrochemical cell stack in accordance with the invention.

Referring to FIGS. 2 and 3, because the integrated electrochemical stack 100 contains multiple types of electrochemical cells that are electrically and thermally integrated together, each type of electrochemical cell will be discussed separately to provide a better understanding of the invention. Thus, FIGS. 2 and 3 illustrate the function and operation of each electrochemical cell separately. FIG. 4, on the other hand, shows the electrochemical cells integrated together to aid in discussing the synergies that are produced thereby.

Referring to FIG. 2, one or more electrolyzer cells 200, such as solid oxide electrolyzer cells 200, may be integrated into the electrochemical cell stack 100 to electrolyze an oxygen-containing compound such as steam or carbon dioxide. If the desired output from the electrochemical stack 100 is electricity and hydrogen, then steam is used as the oxygen-containing input. As will be explained in more detail hereafter, the electrolyzer cell 200 may also be used to reform a hydrocarbon fuel to produce a reformed fuel such as synthesis gas ($CO+H_2$). In addition to providing synthesis gas, the hydrocarbon fuel also has the effect of depolarizing the anode 202 of the electrolyzer cell 200 to reduce the electrical input required to electrolyze an oxygen-containing compound 106 (e.g., steam).

As illustrated in FIG. 2, in selected embodiments, hydrocarbon fuel and a small amount of steam may be supplied to an anode 202 of the electrolyzer cell 200 where it may react with oxygen ions supplied through the electrolyte membrane 206 to form synthesis gas 203. Similarly, steam 106 may be supplied to the cathode 204, where oxygen may be stripped away to form hydrogen gas 114 (along with some residual steam 114) in accordance with the following equation:

$$H_2O+2e^-\rightarrow H_2+O^=$$

At the cathode 204, electrons may combine with the oxygen to form oxygen ions which may be transported through an oxygen-ion-conducting electrolyte 206 to the anode 202. At the anode 202, the oxygen ions and hydrocarbon fuel 102 may form a sub-stoichiometric fuel-air mixture that reacts to partially oxidize the hydrocarbon fuel 102 to produce synthesis gas 203 in accordance with the following equation:

$$CH_n+O^=\rightarrow CO+(n/2)H_2+2e^-$$

The small amounts of steam that are present in the hydrocarbon fuel stream 102 may also be used to reform the hydrocarbon fuel in the stream 102 to produce synthesis gas through a steam reforming process. Electrons that are produced by the reaction at the anode 202 may be transported through an external circuit 208.

The electrolyzer/partial oxidation cell 200 illustrated in FIG. 2 provides various advantages over conventional electrolyzer cells. Conventional steam electrolyzer cells typically receive a mixture of steam and hydrogen to the cathode 204 and air to the anode 202. The open circuit voltage of a conventional electrolyzer cell 200 is typically between about 0.8 and 0.9 volts, which depends on the ratio of hydrogen to steam supplied to the cathode 204 as well as its operating temperature. To electrolyze the steam at the cathode 204, a voltage of approximately 1.3 to 1.4 volts (as supplied by a power source 210) must be applied to the electrodes 202, 204 to move oxygen ions from the cathode side to the anode side. This consumes excessive electricity because it drives oxygen ions against a high chemical potential gradient.

To reduce the chemical potential gradient and thereby reduce the amount of electricity required to electrolyze the steam, a reducing hydrocarbon fuel 102 such as natural gas, methane, or the like may be supplied to the cathode 204. Instead of evolving oxygen gas at the anode 202, the hydrocarbon fuel 102 reacts with the oxygen at the anode 202 to significantly reduce the amount of oxygen gas that evolves at the anode 202. This reduces the oxygen partial pressure and thus the chemical potential gradient of oxygen across the cell 200. As a result, the voltage required to drive oxygen ions from the cathode side to the anode side is greatly reduced. In selected embodiments, this voltage may be reduced to between about 0.2 and 0.3 volts. This provides a voltage reduction of about 1 volt compared to conventional electrolysis cells and reduces the amount electricity required to operate the cell by about 70 to 80 percent. Because energy provided by natural gas is much cheaper than energy provided by electricity, the reducing hydrocarbon gas 102 reduces costs significantly.

The overall reaction occurring at the anode 202 and cathode 204 is roughly equivalent to a steam reforming process, which is endothermic. By contrast, the reformation reaction occurring at the anode 202 alone can range form slightly endothermic to slightly exothermic depending on the amount of oxygen that is supplied to the reaction by steam in the hydrocarbon mixture 102 compared to the amount of oxygen supplied through the electrolyte membrane 206. Because the overall reaction is endothermic, the cell 200 requires significant thermal input 212 in order to operate effectively.

Referring to FIG. 3, in selected embodiments, the integrated electrochemical stack 100 may include one or more heat-generating fuel cells 300, such as solid oxide fuel cells 300, to produce electricity. The fuel cell 300 may include an anode 302, a cathode 304, and an electrolyte membrane 306. A reformed fuel such as synthesis gas 203 may be supplied to the anode 302 where it may react with oxygen ions supplied through the membrane 306 to produce carbon dioxide and steam 110. Air 104 or an oxygen-containing gas may be supplied to the cathode 304 where the oxygen may be reduced to produce oxygen ions. These oxygen ions may travel through the electrolyte membrane 306 to the anode 302 where they may react with carbon monoxide and/or hydrogen in accordance with the following equations:

$$H_2+O^=\rightarrow H_2O+2e^-$$

$$CO+O^=\rightarrow CO_2+2e^-$$

$$CO+H_2O\rightarrow CO_2+H_2 \text{(shift reaction)}$$

This reaction may release electrons at the anode 302 for delivery to a load 308. Similarly, electrons may be consumed at the cathode 304 when the oxygen in the air stream 104 is reduced.

The fuel cell 300 may generate significant amounts of heat due to exothermic chemical reactions and ohmic losses. Although higher temperatures will actually improve the performance of a solid oxide fuel cell 300 by reducing internal resistance, temperatures above 850° C. will cause the cells to degrade at much higher rates. Thus, operating temperature must be carefully controlled to maximize the cell's long term performance. In conventional solid oxide fuel cells, airflow rates are generally designed to be significantly higher than what is needed for the electrochemical reaction in order to remove waste heat. This typically requires expensive heat exchangers to pre-heat the increased airflow. As will be explained in more detail hereafter, the integrated nature of the cell stack 100 may greatly reduce the size and cost of required heat exchangers.

Figure 4A:
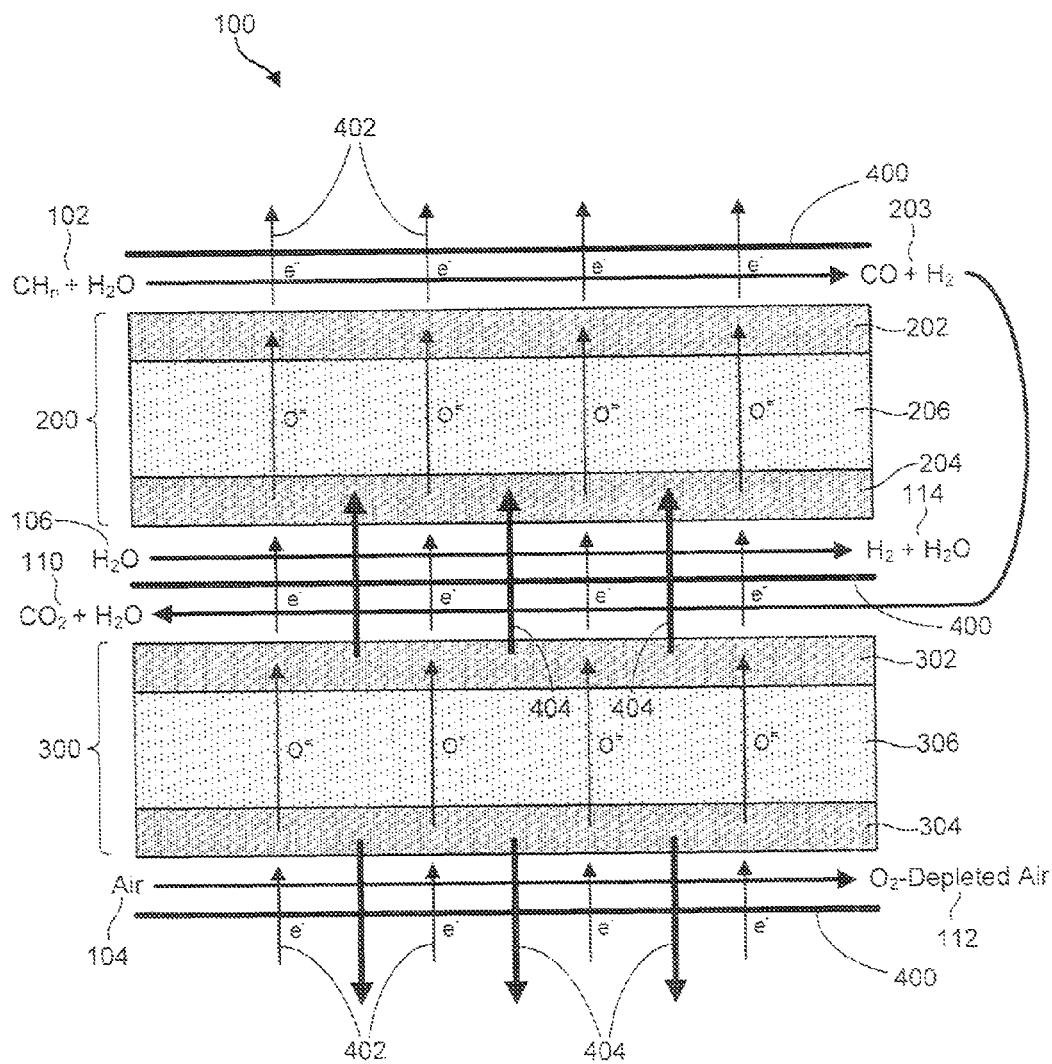
FIG. 4A is a high-level block diagram showing one embodiment of a thermally and electrically integrated fuel cell and electrolyzer cell for inclusion in an integrated solid-state electrochemical cell stack in accordance with the invention.

Referring to FIG. 4A, the electrochemical cells 200, 300 described in association with FIGS. 2 and 3 may be physically integrated together in a single solid-state electrochemical stack 100. These cells 200, 300 may be thermally and electrically integrated together in a way that increases the efficiency of both cells 200, 300. As shown, the integrated cell stack 100 may include one or more electrolyzer cells 200 that are physically adjacent to one or more fuel cells 300. Gas flows routed to and from the cells 200, 300 may be isolated using gas-impermeable interconnect plates 400 that are electrically and thermally conductive. These interconnect plates 400 allow electrical current to flow through the stack 100, as indicated by the electron streams 402.

As illustrated, synthesis gas 203 may be generated at the anode 202 of the electrolyzer cell 200 and may be routed to the anode 302 of the fuel cell 300 to produce electricity. The fuel cell 300 may be a conventional solid oxide fuel cell 300 which generates an electrical potential of about 0.7 volts at customary current densities. Assuming the electrolyzer cell 200 requires 0.3 volts to operate, the pair of cells 200, 300 together may generate approximately 0.4 volts (i.e., 0.7 volts minus 0.3 volts).

Synthesis gas 203 may be routed from the electrolyzer cell 200 to the fuel cell 300 using appropriate conduits, channels, seals, manifolds, and the like. For example, ceramic multi-layer micro-channel monoliths or metal micro-channel analogs, as well as conventional discrete metal interconnects and internal/external manifolds may be used to route reactant streams from one cell to another as well as route input and output reactant streams to and from the cells 200, 300.

Because the overall steam reforming reaction occurring at the electrolyzer cell 200 is highly endothermic, whereas reactions occurring within the fuel cell 300 are highly exothermic, the cells 200, 300 may be thermally coupled together to the benefit of both cells 200, 300. That is, heat generated by the fuel cell 300 may be absorbed by adjacent electrolyzer cells 200, as indicated by the thermal flow lines 404. It has been observed that the small gas flow passages typical of solid oxide fuel cell stacks provide extremely effective thermal and mass transfer coupling between reactant streams and solid components of the stack. In particular, the temperature difference between gases and solids in the stack has been calculated to be on the order of 1° C. By transferring waste heat from the fuel cell 300 to the electrolyzer cell 200, air-flow requirements through the fuel cell 300 are greatly reduced. In some embodiments, the reduced air-flow requirements allow a ten-fold reduction in the area and cost of previously required air-heat exchangers.

Although the overall reaction occurring at the electrolyzer cell 200 is equivalent to a steam reforming process, hydrogen produced by the reaction is separated into two isolated reactant streams. The first reactant stream 203 contains carbon monoxide which, although suitable as fuel for a solid oxide fuel cell 300, is unsuitable for PEM fuel cells without further chemical processing and purification. The second reactant stream 114 contains hydrogen and any residual steam. The steam may be removed from the reactant stream 114 with a condenser or other suitable device to produce high purity hydrogen, suitable for applications such as PEM fuel cells.

In selected embodiments, the fuel cell 300 may be a typical solid oxide fuel cell with conventional anode and cathode materials. The electrolyte may include oxygen-ion conductors such as doped zirconia, doped lanthanum gallate, doped ceria, or other suitable materials. In selected embodiments, the electrolyzer cell 200 may be structurally equivalent to or similar to the solid oxide fuel cell 300, except that the cathode 204 (i.e., the electrolysis electrode) may be fabricated from a material which is identical to or similar to the anodes 202, 302 of each cell 200, 300. This material may include, for example, a nickel cermet material. Conventional dimensions, materials, and methods of fabrication may be used to produce a solid oxide fuel cell 300 and solid oxide electrolyzer cell 200. The interconnect plates 400 may be fabricated from metallic or ceramic materials which are stable in the presence of oxidizing or reducing reactants.

Figure 4B:
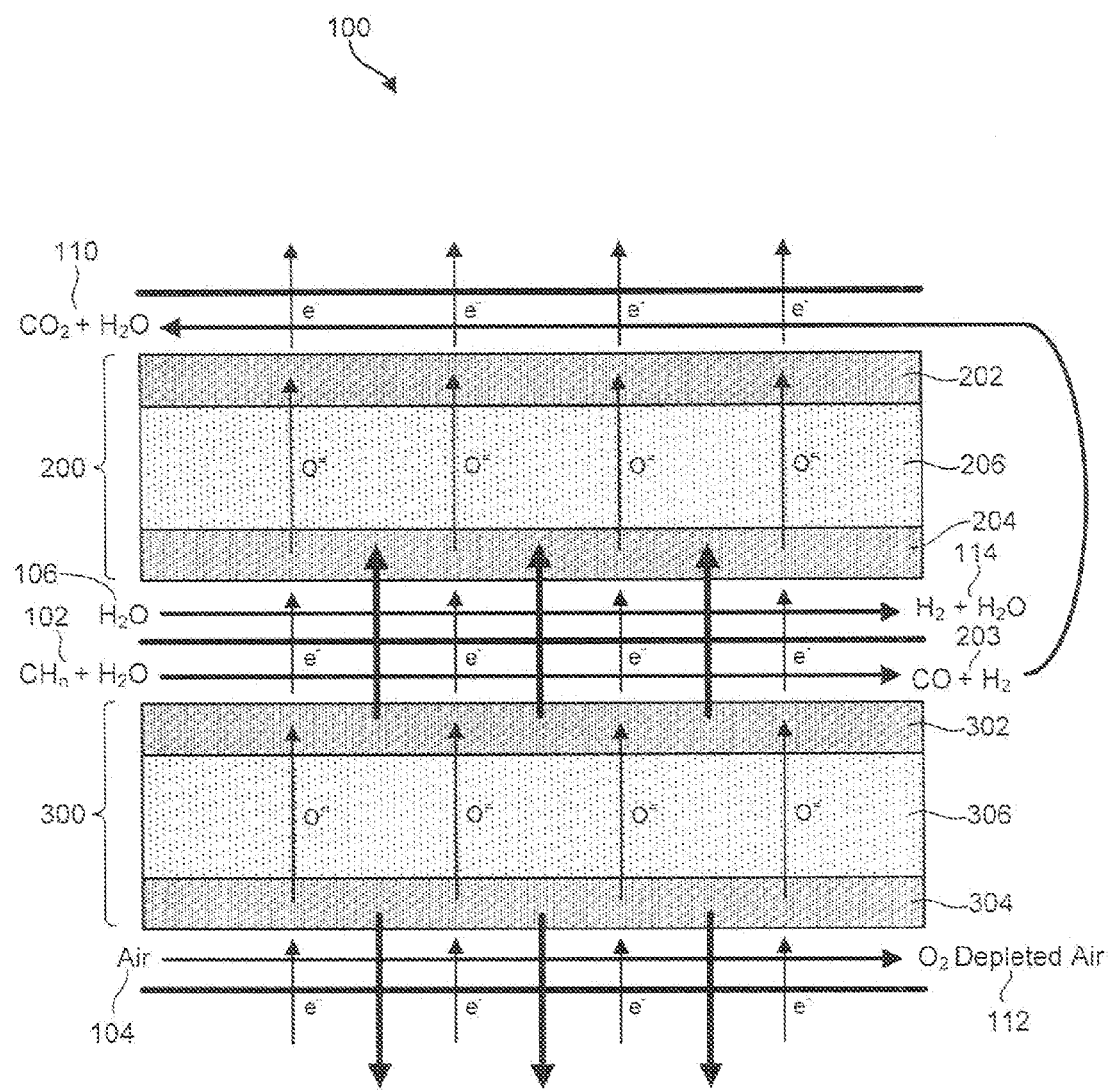
FIG. 4B is a high-level block diagram showing an alternative embodiment of a thermally and electrically integrated fuel cell and electrolyzer cell for inclusion in an integrated solid-state electrochemical cell stack in accordance with the invention.

Referring to FIG. 4B, in another embodiment, the fuel cell 300 may be configured to act as the reformer for the electrolysis cell 200. For example, an unreformed hydrocarbon stream 102 may be supplied to the anode 302 of the fuel cell 300, where it may be partially oxidized to produce synthesis gas 203 and electricity 402. This synthesis gas 203 may then be routed to the anode 202 of the electrolyzer cell 200, where it may be used as fuel to depolarize the electrolyzer cell 100. The other reactant streams 106, 104 may remain substantially the same.

Figure 4C:
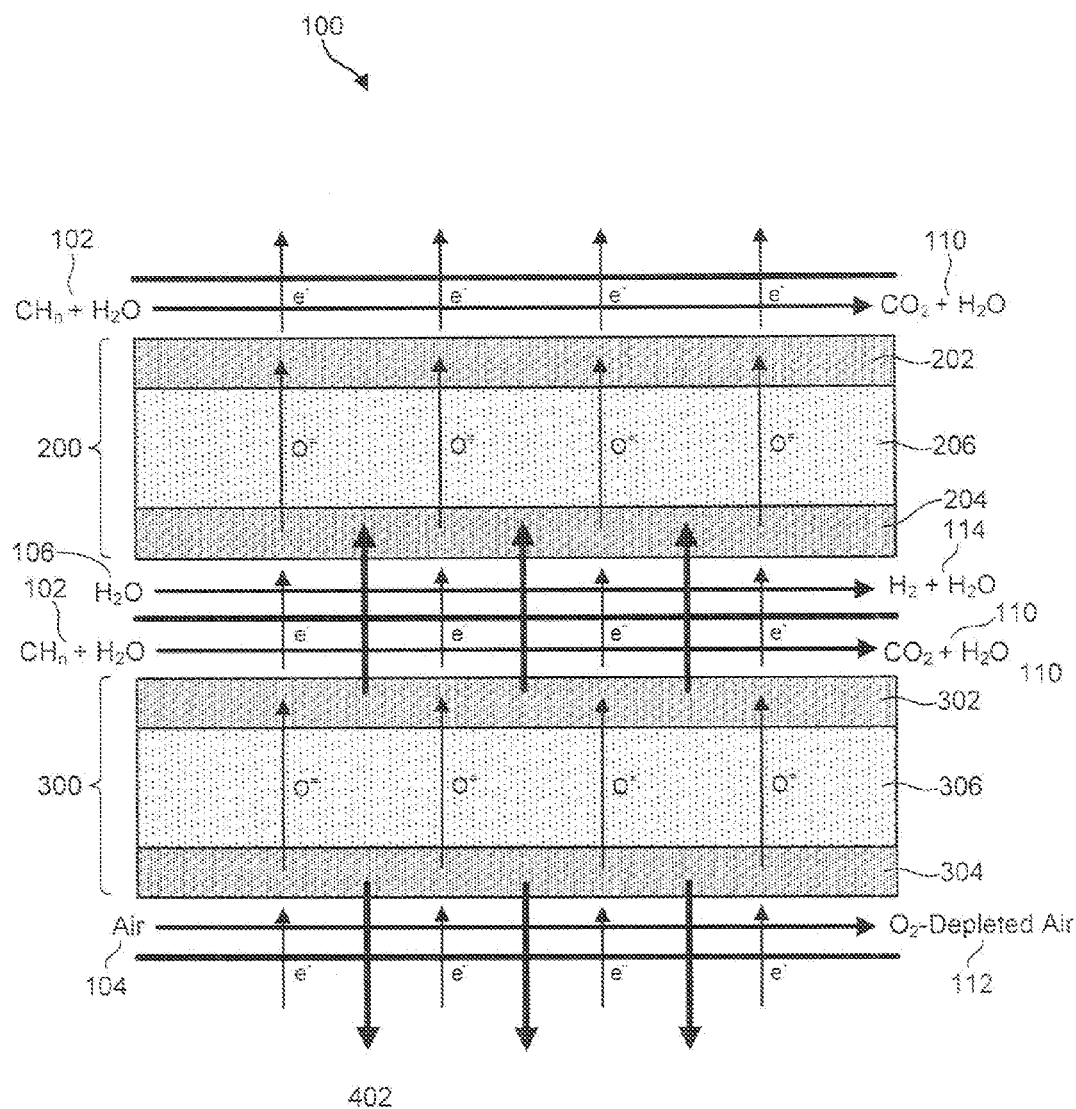
FIG. 4C is a high-level block diagram showing a second alternative embodiment of a thermally and electrically integrated fuel cell and electrolyzer cell for inclusion in an integrated solid-state electrochemical cell stack in accordance with the invention.

Referring to FIG. 4C, in yet another embodiment, both the fuel cell 300 and the electrolyzer cell 200 may fully oxidize an unreformed hydrocarbon input stream 102 without the need for a separate reformer. For example, a hydrocarbon stream 102 may be supplied to the anodes 202, 302 of the electrolyzer cell 200 and the fuel cell 300, where it may be totally oxidized to produce the output stream 110 containing steam and carbon dioxide. Although the amount of heat generated and/or absorbed by each of the cells 200, 300 may vary for each of the embodiments of FIGS. 4A through 4C, the embodiments are globally equivalent both electrochemically and thermally, and thus will achieve a substantially similar result.

In selected embodiments, an integrated electrochemical stack 100 in accordance with the invention may be suitable for use in distributed hydrogen production stations. Such stations may produce hydrogen gas at remote sites using natural gas and water as inputs, for which there is already a delivery infrastructure. The integrated electrochemical stack 100 may also produce electricity that can be used to compress and liquefy the hydrogen that is produced by the stack 100. This process typically requires compressing the hydrogen to pressures of 10,000 PSI or more, which may consume 10 to 15 percent of the energy stored by the hydrogen. Furthermore, unlike the exhaust from conventional steam-reformed methane, the stack's exhaust contains concentrated carbon dioxide which makes it easier to extract and sequester. Electricity produced by the stack 100 may be used to compress and sequester the carbon dioxide.

Figure 5A:
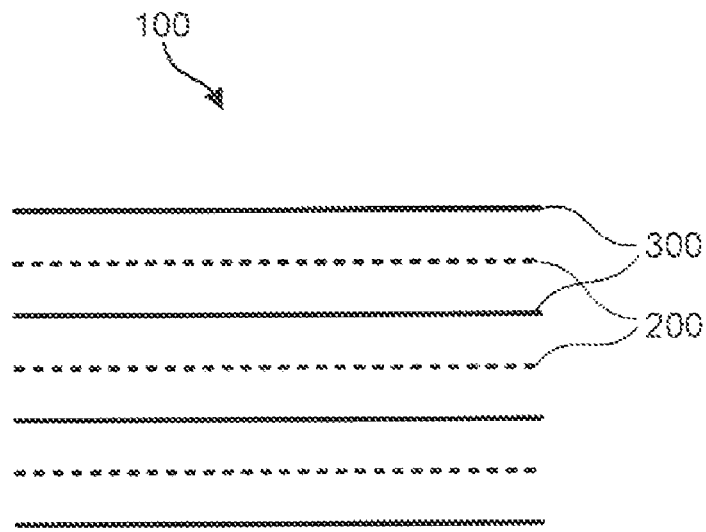
FIG. 5A is a high-level block diagram showing one embodiment of an integrated electrochemical cell stack having interleaved fuel and electrolyzer cells in a 1:1 ratio.
Figure 5B:
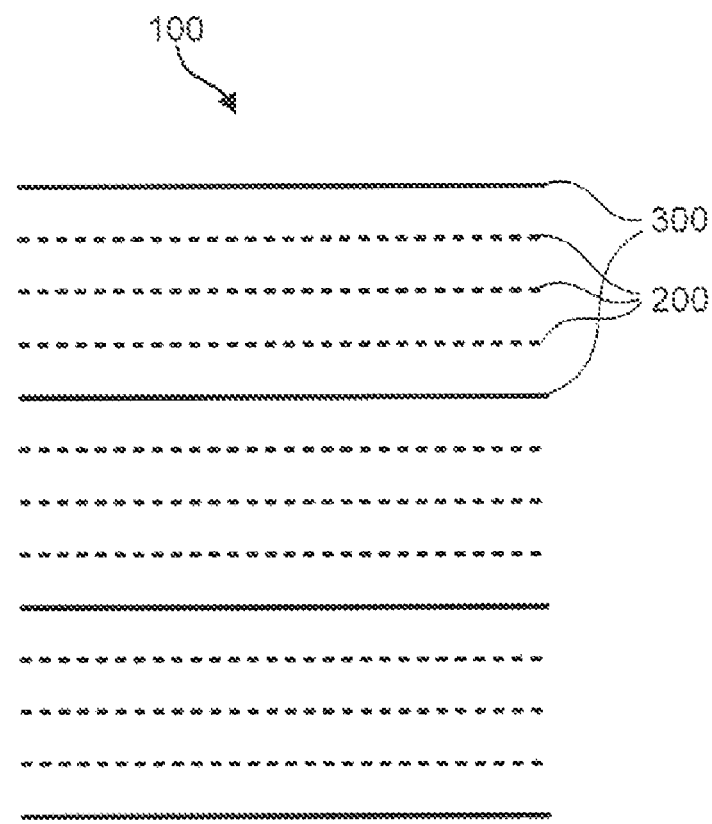
FIG. 5B is a high-level block diagram showing one embodiment of an integrated electrochemical cell stack having interleaved electrolyzer and fuel cells in a 3:1 ratio.

Referring to FIGS. 5A and 5B, the number and order of electrochemical cells 200, 300 may be varied to adjust the ratio of hydrogen to electricity produced by the electrochemical cell stack 100 (i.e., adjust the mass and energy balances of the cell stack 100) and to adjust the thermal characteristics of the cell stack 100 (i.e., adjust the heat produced and heat absorbed by each cell 200, 300). For example, FIG. 5A shows a cell stack 100 with a 1:1 ratio of electrolyzer cells 200 to fuel cells 300, which may provide generally balanced electricity and hydrogen production. FIG. 5B shows a cell stack 100 with a 3:1 ratio of electrolyzer cells 200 to fuel cells 300, which may increase hydrogen production relative to electricity production. These ratios may be varied as desired to provide different relative levels of hydrogen and electricity production.

Figure 6:
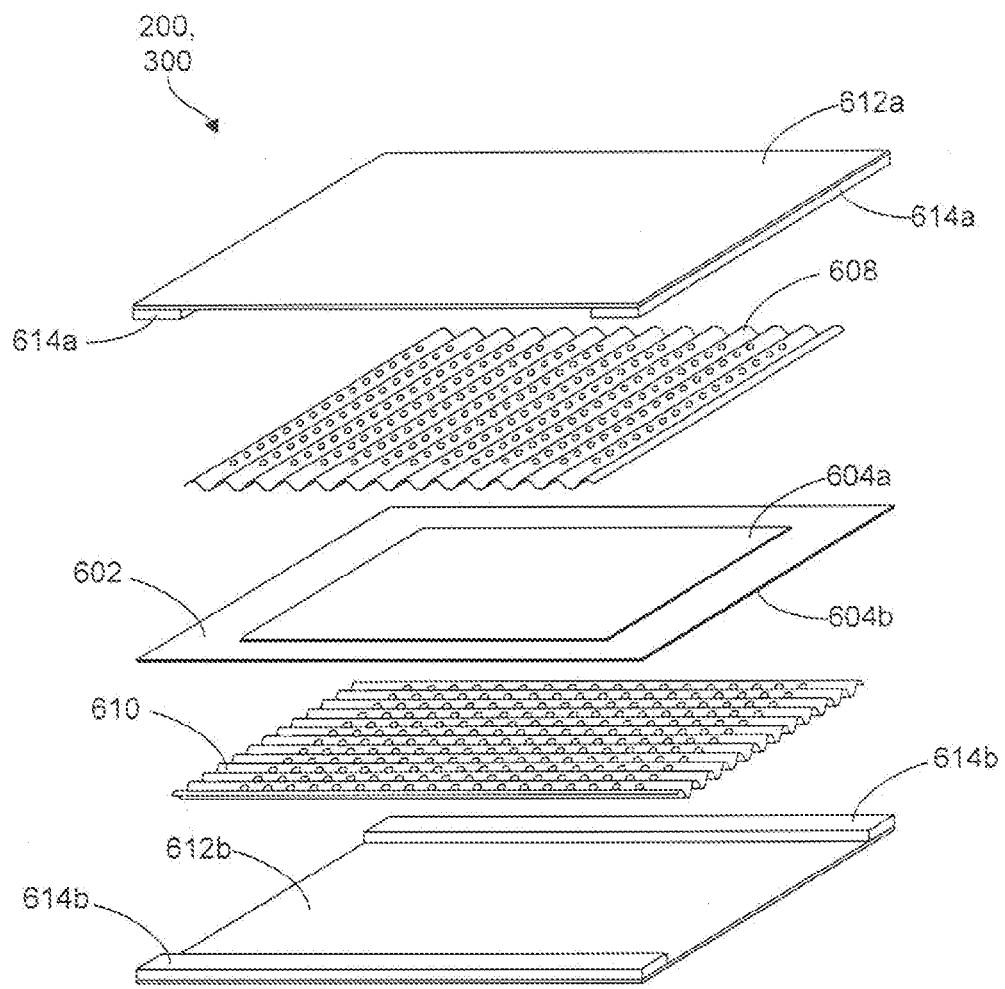
FIG. 6 is an exploded perspective view of one physical embodiment of a fuel or electrolyzer cell in accordance with the invention.

Referring to FIG. 6, one non-limiting example of a physical implementation of a fuel cell 300 or electrolyzer cell 200 is illustrated. Many other physical implementations are possible and fall within the scope of the present invention. As shown, an electrolyzer or fuel cell 200, 300 may, in selected embodiments, include an oxygen-ion conductive electrolyte layer 602, such as an oxygen-ion conductive ceramic layer 602. Electrodes 604a, 604b may be deposited, such as by screen printing, on each side of the electrolyte layer 602. The electrodes 604a, 604b may be porous to facilitate the flow of gas therethrough.

To convey gases to the electrodes 604a, 604b, corrugated and perforated layers 608, 610, that are also electrically and thermally conductive, may be placed adjacent to each of the electrodes 604a, 604b. These layers 608, 610 may be used to create open space to facilitate gas flow to the electrodes 604a, 604b and may be positioned perpendicular to one another to facilitate gas flow in two perpendicular directions. For example, gases may flow to and from the lower electrode 604b through the space created by the corrugated layer 610. Similarly, gases may flow to and from the electrode 604a through open space created by the layer 608.

Electrically conductive interconnect plates 612a, 612b may be placed adjacent to each corrugated layer 608, 610 to physically separate each cell 200, 300, provide an electrically and thermally conductive path between each cell 200, 300, and create a barrier to prevent gases from passing between adjacent cells 200, 300. Edge rails 614a, 614b may be used to seal the sides of the cell 200, 300 by abutting against the interconnect plates 612*a*, 612*b* and the ceramic electrolyte layer 602. The upper and lower sets of rails 614*a*, 614*b* may be aligned perpendicular to one another to accommodate gas flow in two directions.

Figure 7:
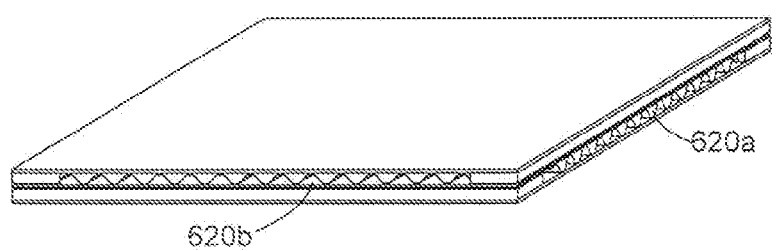
FIG. 7 is an assembled perspective view of the fuel or electrolyzer cell illustrated in FIG. 6.

Referring to FIG. 7, when assembled, the cell 200, 300 forms a flat structure that is easily stacked with other cells 200, 300. Each cell 200, 300 may include channels 620*a*, 620*b* extending from front-to-back and side-to-side to carry gases in and out of the cell 200, 300. As mentioned previously, these channels 620*a*, 620*b* may be connected to conduits, manifolds, or the like to provide the desired routing of reactant streams.

The present invention may be embodied in other specific forms without departing from its basic principles or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to produce high purity hydrogen and electricity, the apparatus comprising: at least one fuel cell configured to convert the chemical energy of a fuel to electricity and heat; at least one electrolyzer cell in electrical and thermal communication with the fuel cell, the electrolyzer cell configured to electrolyze an oxygen-containing compound using the electricity and heat generated by the fuel cell, wherein the fuel cell and the electrolyzer cell are physically integrated into a single electrochemical cell stack to facilitate a flow of all electrical current from the fuel cell through both the fuel cell and the electrolyzer cell within the single electrochemical cell stack; and at least two interconnect plates that are electrically conductive, thermally conductive and gas-impermeable, wherein either at least a) a first interconnect plate is disposed between an anode of a first fuel cell and a cathode of a first electrolyzer cell and a second interconnect plate is disposed between a cathode of the first fuel cell and an anode of a second electrolyzer cell or b) the first interconnect plate is disposed between the anode of the first fuel cell and the cathode of a first electrolyzer cell and the second interconnect plate is disposed between a cathode of a second fuel cell and an anode of the first electrolyzer cell.

2. The apparatus of claim 1, wherein the fuel is a reformed fuel, and the electrolyzer cell is further configured to partially oxidize a hydrocarbon fuel to produce the reformed fuel.

3. The apparatus of claim 1, wherein the oxygen-containing compound is selected from the group consisting of steam and carbon dioxide.

4. The apparatus of claim 2, wherein the electrolyzer cell further uses the heat generated by the fuel cell to aid in partially oxidizing the hydrocarbon fuel.

5. The apparatus of claim 2, wherein the electrolyzer cell electrolyzes the oxygen-containing compound at a cathode thereof, and partially oxidizes the hydrocarbon fuel at an anode thereof.

6. The apparatus of claim 1, wherein the fuel cell oxidizes the fuel at an anode thereof, and reduces an oxygen-containing gas at a cathode thereof.

7. The apparatus of claim 1, wherein the fuel cell is a solid oxide fuel cell, and the electrolyzer cell is a solid oxide electrolyzer cell.

8. A method to produce high purity hydrogen and electricity, the method comprising:
reforming, with an electrolyzer cell, a hydrocarbon feedstock fuel to produce a reformed fuel, wherein the electrolyzer cell comprises an anode, a cathode, and an electrolyte interposed between the anode and the cathode;
converting, with a fuel cell, the chemical energy of the reformed fuel to electricity and heat, wherein the fuel cell comprises an anode, a cathode, and an electrolyte interposed between the anode and the cathode, wherein the fuel cell and the electrolyzer cell are physically integrated into a single electrochemical cell stack;
transferring at least a portion of the heat and electricity to the electrolyzer cell to facilitate a flow of all electrical current from the fuel cell through both the fuel cell and the electrolyzer cell within the single electrochemical cell stack; and
electrolyzing, with the electrolyzer cell, an oxygen-containing compound using the heat and electricity generated by the fuel cell.

9. The method of claim 8, wherein the reformed fuel is synthesis gas.

10. The method of claim 8, further comprising partially oxidizing, with the electrolyzer cell, the hydrocarbon feedstock fuel to produce the reformed fuel.

11. The method of claim 10, wherein partially oxidizing comprises partially oxidizing the hydrocarbon feedstock fuel at the anode of the electrolyzer cell.

12. The method of claim 10, further comprising utilizing the heat generated by the fuel cell to aid in partially oxidizing the hydrocarbon feedstock fuel.

13. The method of claim 8, wherein electrolyzing an oxygen-containing compound comprises electrolyzing an oxygen-containing compound at the cathode of the electrolyzer cell.

14. The method of claim 8, further comprising reducing oxygen at the cathode of the fuel cell.

15. The method of claim 8, wherein the fuel cell is a solid oxide fuel cell, and the electrolyzer cell is a solid oxide electrolyzer cell.

16. A method to produce high purity hydrogen and electricity, the method comprising:
partially oxidizing, at an anode of an electrolyzer cell, hydrocarbon fuel to produce synthesis gas, wherein the electrolyzer cell comprises the anode, a cathode, and an electrolyte interposed between the anode and the cathode;
conveying the synthesis gas to an anode of a fuel cell, wherein the fuel cell comprises an anode, a cathode, and an electrolyte interposed between the anode and the cathode, wherein the fuel cell and the electrolyzer cell are physically integrated into a single electrochemical cell stack;
converting, at the anode of the fuel cell, the synthesis gas to steam and carbon dioxide;
generating electricity at the fuel cell, wherein the fuel cell is arranged in a circuit with the electrolyzing cell to facilitate a flow of all electrical current from the fuel cell through both the fuel cell and the electrolyzer cell within the single electrochemical cell stack electrolyzing, at the cathode of the electrolyzer cell, steam to produce hydrogen; and
reducing oxygen at the cathode of the fuel cell.

17. The method of claim 16, further comprising transferring heat and electricity from the fuel cell to the electrolyzer cell to partially oxidize the hydrocarbon fuel and electrolyze the steam.

18. An integrated electrochemical stack to produce high purity hydrogen and electricity, the integrated electrochemical stack comprising: a plurality of fuel cells configured to convert the chemical energy of a fuel to electricity and heat; a plurality of electrolyzer cells interleaved with the plurality of fuel cells in a single electrochemical cell stack, the plurality of electrolyzer cells in electrical and thermal communication with the plurality of fuel cells to facilitate a flow of all electrical current from at least one of the fuel cells through at least one of the electrolyzer cells, the plurality of electrolyzer cells configured to electrolyze an oxygen-containing compound using the electricity and heat generated by the plurality of fuel cells; and a plurality of interconnect plates that are electrically conductive, thermally conductive and gas-impermeable, each of the interconnect plates disposed between either a) an anode of one of the plurality of fuel cells and a cathode of one of the plurality of electrolyzer cells or b) a cathode of one of the plurality of fuel cells and an anode of one of the plurality of electrolyzer cells.

19. The integrated electrochemical stack of claim 18, wherein the fuel is a reformed fuel.

20. The integrated electrochemical stack of claim 19, wherein the plurality of electrolyzer cells is configured to partially oxidize a hydrocarbon fuel to produce the reformed fuel.

21. The integrated electrochemical stack of claim 20, wherein the plurality of electrolyzer cells uses the heat generated by the plurality of fuel cells to aid in partially oxidizing the hydrocarbon fuel.

22. The integrated electrochemical stack of claim 18, wherein the fuel is an un-reformed hydrocarbon fuel.

23. The integrated electrochemical stack of claim 18, where at least one of multiple fuel cells and multiple electrolyzer cells are grouped together within the electrochemical cell stack.

24. The integrated electrochemical stack of claim 18, wherein the oxygen-containing compound is selected from the group consisting of steam and carbon dioxide.

25. The apparatus of claim 1, further comprising a layer disposed between the interconnect plate and the fuel cell or the electrolyzer cell, wherein the layer is electrically conductive, thermally conductive, and gas-permeable.

26. The apparatus of claim 1, wherein the single electrochemical cell stack comprises a plurality of fuel cells and a plurality of electrolyzer cells, with a 1:1 ratio of the fuel cells to the electrolyzer cells, to provide generally balanced production of the electricity and the hydrogen.

27. The apparatus of claim 1, wherein the single electrochemical cell stack comprises a plurality of fuel cells and a plurality of electrolyzer cells, with a ratio other than 1:1 of the fuel cells to the electrolyzer cells, to provide different relative levels of production of the electricity and the hydrogen.

* * * * *